US012136357B2

(12) United States Patent
Allard

(10) Patent No.: US 12,136,357 B2
(45) Date of Patent: Nov. 5, 2024

(54) SUBLIMINAL SECURITY APPARATUS AND METHOD

(71) Applicant: Roger Allard, San Diego, CA (US)

(72) Inventor: Roger Allard, San Diego, CA (US)

( * ) Notice: Subject to any disclaimer, the term of this patent is extended or adjusted under 35 U.S.C. 154(b) by 0 days.

(21) Appl. No.: 15/984,304

(22) Filed: May 18, 2018

(65) Prior Publication Data

US 2019/0088174 A1 Mar. 21, 2019

Related U.S. Application Data

(60) Provisional application No. 62/507,790, filed on May 18, 2017.

(51) Int. Cl.

*G09F 13/02* (2006.01)
*G09F 19/12* (2006.01)
*G09F 19/22* (2006.01)

(52) U.S. Cl.

CPC .............. *G09F 19/12* (2013.01); *G09F 13/02* (2013.01); *G09F 19/22* (2013.01)

(58) Field of Classification Search

CPC ........... G09F 19/12; G09F 13/02; G09F 19/22
See application file for complete search history.

(56) References Cited

U.S. PATENT DOCUMENTS

| | | | | | |
|---|---|---|---|---|---|
| 3,060,795 | A * | 10/1962 | Corrigan | A61M 21/00 | 352/131 |
| 4,270,284 | A * | 6/1981 | Skellings | G09B 17/003 | 434/156 |
| 4,279,088 | A * | 7/1981 | Hyre | G09F 13/12 | 40/442 |
| 4,692,118 | A * | 9/1987 | Mould | A61M 21/00 | 40/584 |
| 4,734,037 | A * | 3/1988 | McClure | G09B 19/00 | 40/427 |
| 5,017,143 | A * | 5/1991 | Backus | G09B 19/00 | 434/236 |
| 5,221,962 | A * | 6/1993 | Backus | H04N 5/44513 | 348/563 |
| 5,270,800 | A * | 12/1993 | Sweet | G09B 5/065 | 348/473 |
| 6,108,142 | A * | 8/2000 | Haseltine | H04N 5/72 | 359/809 |
| 6,940,432 | B1 * | 9/2005 | Hall | A63H 3/003 | 341/110 |
| 8,188,990 | B2 * | 5/2012 | Zamorsky | A61H 5/00 | 345/204 |
| 2003/0235808 | A1 * | 12/2003 | Hardison | G09B 5/04 | 434/236 |
| 2008/0244940 | A1 * | 10/2008 | Mesika | G09F 13/12 | 40/219 |

* cited by examiner

*Primary Examiner* — Cassandra Davis
(74) *Attorney, Agent, or Firm* — William Gray Mitchell

(57) ABSTRACT

A subliminal security apparatus, adapted for use upon a human eye is disclosed, having a subliminal message, disposed upon a surface, adapted to be unperceivable to the human eye and at least one optical element, adapted to convey a message to the human eye via the subliminal message.

3 Claims, 4 Drawing Sheets

SUBLIMINAL SECURITY APPARATUS AND METHOD

This non provisional U.S. patent application claims the benefit of priority to earlier filed U.S. provisional patent application having Ser. No. 62/507,790, entitled, "SUBLIMINAL SECURITY APPARATUS AND METHOD", filed May 18, 2017 and is hereby incorporated by reference.

FIELD

The present invention relates generally to a security system employing techniques related to subliminal messaging, which compel wrongdoers to voluntarily disclose to security officials their potentially criminal acts prior to such criminal activity occurring and/or deterring such acts altogether.

RELATED ART

Concerns for addressing issues of National Security have been a growing concern worldwide in recent years with increasing violence associated with terrorist activities, particularly in light of "homegrown" radicalization across many nations. Numerous solutions have been developed to address preventive and deterrent measures to mitigate human casualties from such terrorist activities. However, in developed countries, such as the United States, governments must straddle a balance between security and privacy protections assured to citizens via national laws, such as for example the Fourth Amendment to the United States Constitution which creates a necessary boundary between government encroachments upon the reasonable expectation of privacy of citizens against unwarranted invasions, such as surveillance. Indeed, relatively recent disclosures by National Security Agency analyst Edward Snowden revealed massive surveillance of American citizens on an unprecedented scale, even in the face of Congressional testimony by the Director of National Intelligence to the contrary, which may have violated such a balance between privacy protections and attempts to provide national security.

Significant resources have been employed for widespread surveillance of persons of interest by governmental bodies, such as the National Security Agency, the Central Intelligence Agency, and the like. Furthermore, since the infamous attack in New York on Sep. 11, 2001 on the World Trade Center, wherein airplanes were used as weapons to attack American citizens, significant measures have been taken to prevent such egregious attacks in the future, such as for example extensive screening in airports prior to allowing persons to board airplanes. However, for every security measure taken, be it surveillance, airport screening and the like, all such measures have limited effectiveness. For example, in mass surveillance, persons plotting harm can use coded methods to avoid detection, even when directly monitored. Also, the Transportation Security Administration, primarily responsible for airport security regularly fails to detect harmful objects being taken onto airplanes. Indeed, in recent years bullets, knives and other contraband have been taken onto public aircrafts.

Also, although significantly less dramatic, security associated with retail and merchandise continues to be an issue for stores or other business establishments, which are often popular targets for larceny. In-store cameras, security guards and the like are measures with less than perfect records of mitigating theft.

It would be helpful to have a security measure which is more effective than current methods for both preventing casualties associated with terrorist activities as well as common theft in retail stores.

The present teachings disclose methods and apparatuses that address these concerns. The present teachings solve these problems, as will now be described.

BRIEF DESCRIPTION OF THE DRAWINGS

Embodiments of the present disclosure will be more readily understood by reference to the following figures, in which like reference numbers and designations indicate like elements.

DETAILED DESCRIPTION

Figure 1A:
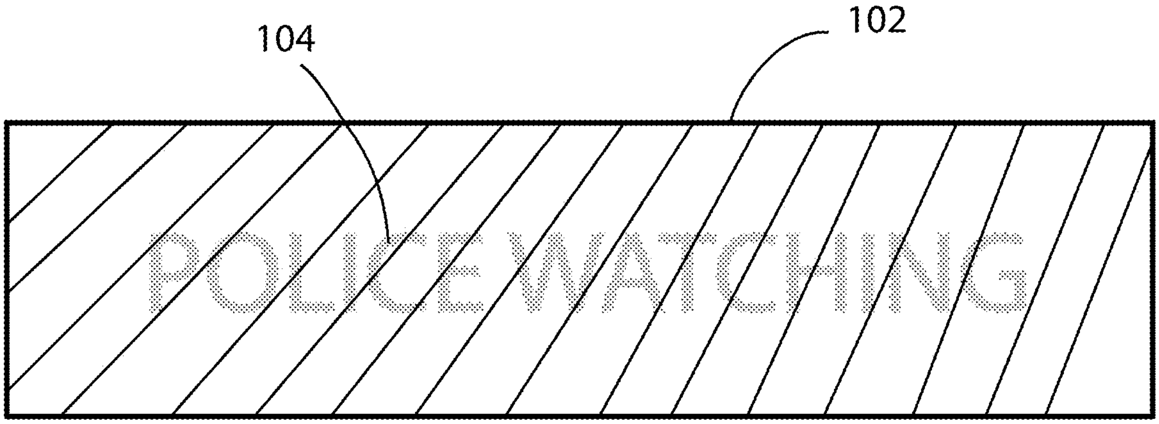
FIG. 1*a* illustrates a front view of an apparatus, according to one embodiment of the present teachings.

Embodiments of the present teachings focus on preventing criminal acts prior to the commission of such acts in a manner that encourages the potential criminal to come forward and confess to law enforcement officials, or refrain from committing the potential criminal act altogether. Embodiments of the present teachings focus on addressing the two components of criminal activity, which will now be described in further detail.

Generally speaking a criminal act requires two fundamental components, mens rea and actus reus. That is, a crime generally requires a mental component, mens rea, and a physical component or act, actus reus. However, there are crimes wherein the mental component is irrelevant and not necessary to establish facts for a conviction of such a crime, which is referred to as a General Intent crime. In a General Intent crime, it is the act itself which constitutes the completed crime. That is, in General Intent crime, the primary inquiry is whether the crime itself was completed. Examples of General Intent crimes include Battery and Rape, wherein completion of the act itself constitutes a complete crime, regardless of intent to commit the crime. In stark contrast, a Specific Intent crime requires that in addition to the criminal act itself, a mental component to commit the crime is also present. In one example of a Specific Intent crime, Larceny is the intentional unlawful taking and carrying away of the property of another with the intent to deprive the lawful owner of the property. One defense to a Specific Intent crime is negating the mens rea, that is the mental component. If the mens rea is negated, this provides a defense to the crime, because in order to be liable for a Specific Intent crime, intent must have been formed. For example, if a person walks into a sporting goods store and picks up a golf club, does not pay for it, and walks out of the store, they may be charged with Larceny. However, because Larceny is a Specific Intent crime, if there are some facts to negate the mental component, the mens rea, the charge of Larceny cannot sustain. For example, if the person who took the golf club from the sporting goods store was inebriated (e.g., drunk or drugged), then they would not be able to form the proper mental state for sustaining a criminal charge of Larceny, because the inebriation would negate the formation of a criminal mental state. However, in the case of General Intent crimes, such a defense is not viable, as the completion of the act itself is only necessary for a criminal charge to sustain.

Some embodiments of the present teachings focus on negating the mens rea component of a crime and other embodiments focus on deterring the actus reus component.

It is an object of the present teachings to address negation of the formation of the mens rea component of a crime by providing subliminal messages which subconsciously erode a person's mental willpower to sustain the intent to commit a crime, or alternatively, to provide subliminal messaging that prevents spontaneous intent to commit a crime, such as for example criminal intent spontaneously developed in the context of simple shoplifting at a retail store.

It is an object of the present teachings to address the prevention of the commission of criminal acts, in that apparatuses and methods disclosed herein provide a solution to preventing the actus reus of criminals by encouraging prospective criminals to surrender and confess prior to the commission of a criminal act, or to physically debilitate such an individual such that commission of the crime becomes impossible.

Figure 1B:
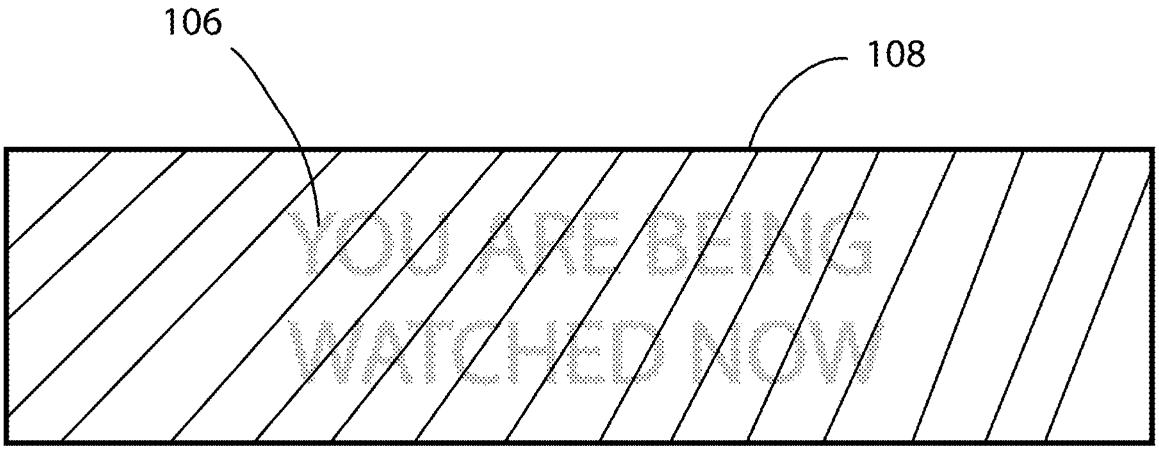
FIG. 1*b* illustrates a front view of an apparatus, according to one embodiment of the present teachings.
Figure 1C:
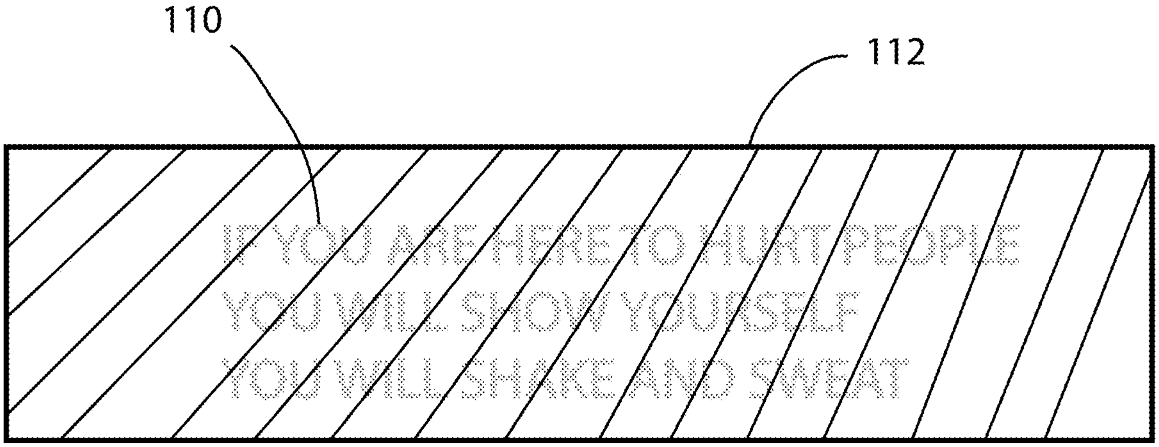
FIG. 1*c* illustrates a front view of an apparatus, according to one embodiment of the present teachings.

Referring now generally to FIG. 1*a*, FIG. 1*b*, and FIG. 1*c*, several variations of one embodiment of a subliminal security apparatus and method 100, according to the present teachings are illustrated. As shown in FIG. 1*a*, a wall 102, such as for example a wall at an airport or in a retail store is shown having a subliminal message 104 written thereupon is illustrated. A "subliminal message" is a signal or message specifically prepared to pass below the normal limits of human perception. That is, a subliminal message is not designed to be perceived by the conscience brain or mind of a person, but designed instead to be perceived by the subconscious mind and/or the unconscious mind. As such, subliminal messaging is generally designed to manipulate a person's "deeper" brain, without such manipulation being consciously perceived by the person. Embodiments of the present teachings employ various techniques of subliminal stimulation, which is in effect sensory stimulation which is below the threshold of a human's ability to consciously perceive such stimulation.

Embodiments of the present teachings are designed to compel persons intending criminal activity to either refrain from such activity, or to confess to law enforcement such premeditated criminal activity.

In one illustrative exemplary embodiment, shown in FIG. 1*a*, the subliminal security apparatus and method 100 is composed of the subliminal message 104 of "Police Watching" written on a wall 102. Numerous methodologies may be employed to imprint the subliminal message 104 onto the wall 102, such that the subliminal message 104 is unperceivable to a human conscience mind interpreting images captured by a person's eyes. In one exemplary embodiment, a paint may be used to create the desired subliminal message 104, such as for example, "POLICE WATCHING", "YOU ARE BEING WATCHED NOW", "IF YOU ARE HERE TO HURT PEOPLE YOU WILL SHOW YOURSELF, YOU WILL SHAKE AND SWEAT", or other such message to compel a person to refrain from engaging in criminal behavior. In such embodiments, a layer of paint may be used to depict the desired message, but then painted over, such that it is nearly impossible to perceive consciously. Other kinds of methods may be employed, such as having paint colors which are very close, so as to be nearly hidden, but still perceivable by the subconscious mind.

A described above, it will be appreciated that embodiments of the present disclosure address both the mens rea (i.e., mental component of the criminal act) and actus reus (i.e., physical component of the criminal act). For example, some crimes may be premeditated and some crimes may be spontaneous. If the crime is premeditated, then the mens rea element has already been formed, such as for example a terrorist strapping on a bomb vest with the intent to detonate an explosive device to harm other persons, then walking into an airport or other public place. In such a criminal activity, embodiments of the present teachings focus on the actus reus element of the crime, so as to most efficiently provide strategic and tactical countermeasures, designed to deter the criminal act. For example, if the subliminal message "POLICE WATCHING" as shown in FIG. 1*a* is detected by a person who has already formed the intent to commit a crime, such as the person wearing a bomb vest in an airport, then the actus reus element may be avoided by appealing to the person's deeper brain region via the subliminal messaging. Similarly, if the subliminal message "IF YOU ARE HERE TO HURT PEOPLE YOU WILL SHOW YOURSELF, YOU WILL SHAKE AND SWEAT", can invoke visceral symptoms in a criminal suspect via the subliminal power of suggestion.

Other crimes may be spontaneous, such as for example a teenager at a retail store randomly deciding to shoplift, who did not walk into the store intending to commit a crime, but then may see an item for which they may begin to form the mental intent to steal. In such a situation, the subliminal message "POLICE WATCHING" as shown in FIG. 1*a* may be sufficient to influence the decision to steal.

It will be appreciated that FIG. 1*a*, FIG. 1*b*, and FIG. 1*c* are a progression from addressing negating the mental component of a crime to negating the physical component of a crime. That is, a subliminal message depicting "POLICE WATCHING" may be sufficient to negate the mens rea of a potential criminal by influencing the decision to steal, whereas such a message may also be employed to negate the actus reus of a potential criminal by appealing to the deeper brain.

In one embodiment, FIG. 1*c* comprises a video monitor 112 projecting an image displayed thereupon, which may be an airport arrival/departure schedule in an airport terminal, an advertising display in a retail store, or literally any other form of video display presented.

Figure 2:
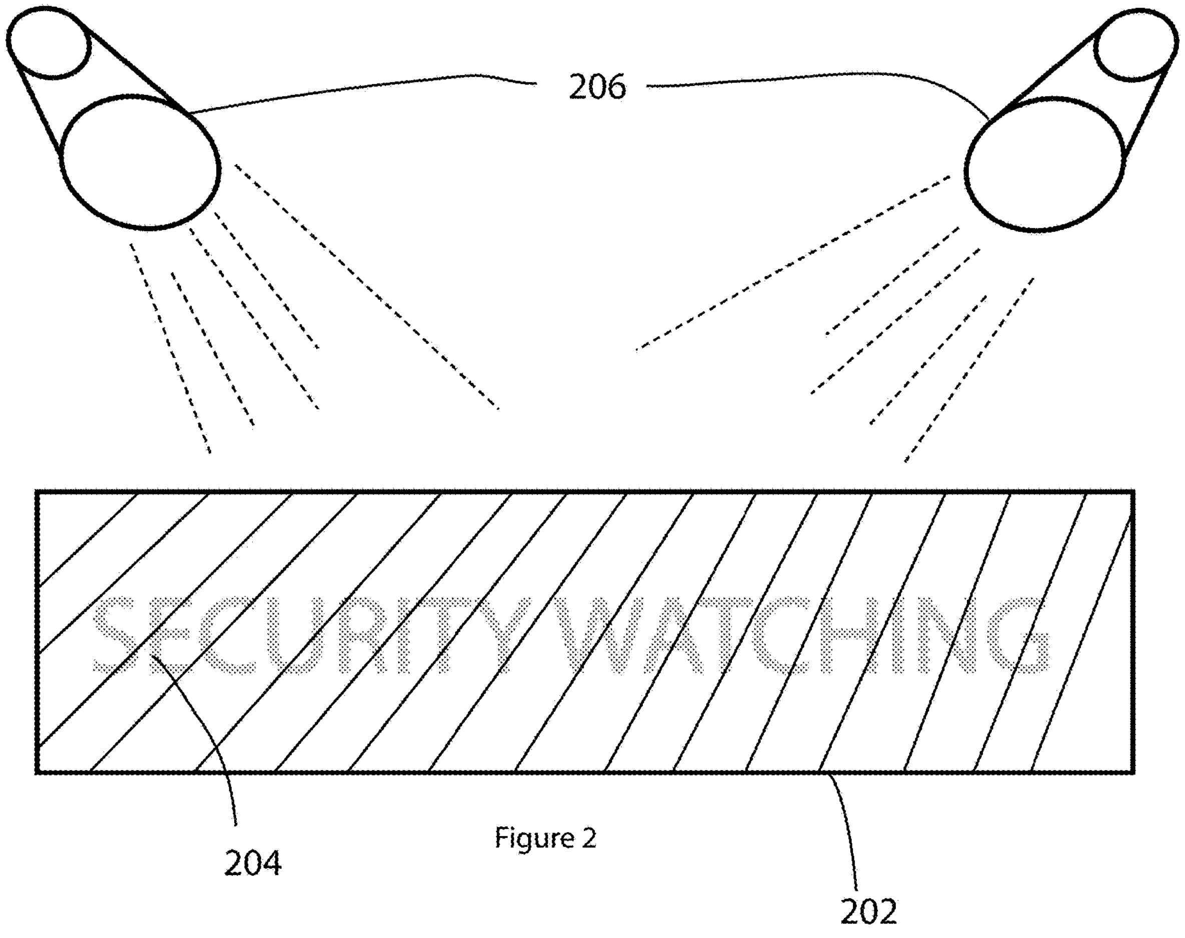
FIG. 2 illustrates a front view of an apparatus, having at least one optical element, according to one embodiment of the present teachings.

Referring now to FIG. 2, a subliminal security apparatus and method 200 is illustrated. Although the specific message, "SECURITY WATCHING" 204 may be altered to address either mens rea or actus reus, the message itself is depicted on a wall 202 similar to that described above with respect to FIGS. 1*a*, 1*b*, and 1*c*, there is at least one optical element 206, which function to emit light, either constantly or periodically, thereupon the specific message 204. Adding this additional, at least one optical element 206 to the specific message 204, allows a broader range of paint techniques or colors to be designed to appeal to the subconscious mind of a potential criminal. For example, a color of paint on the wall, and a specific frequency of light may be combined to be more readily identified by a potential criminal. In one embodiment, the at least one optical element 206 may be periodic (e.g., strobe), at a rate higher than perceivable by the conscious human mind, but which is captured by the subconscious mind in a manner which influences potential criminal decisions and operates to negate either the mens rea and/or the actus reus elements. It will be appreciated that such an apparatus may be used for National Security protection, such as in airports, and/or used in local retail stores to prevent criminal activity.

Figure 3:
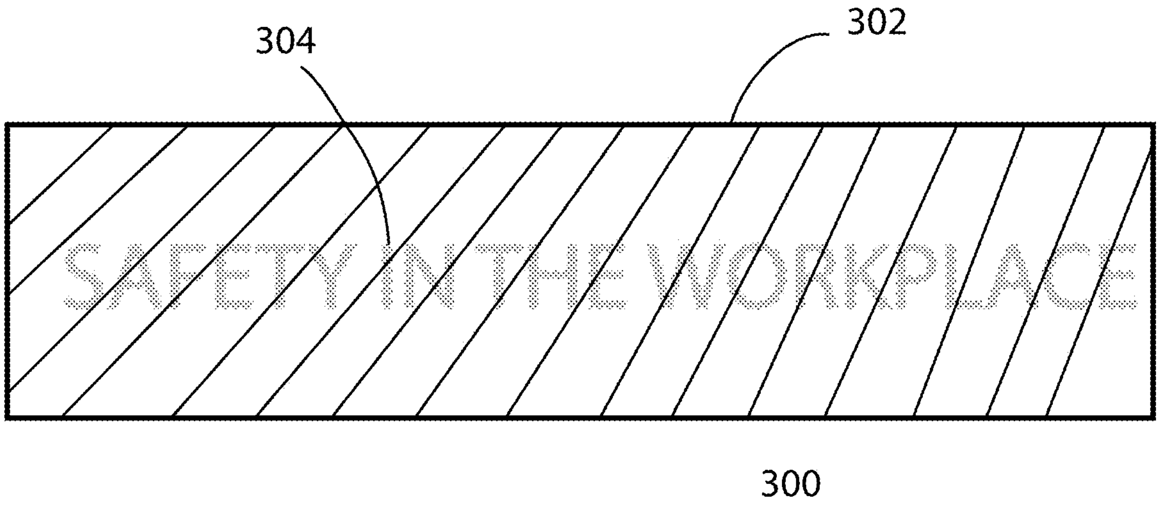
FIG. 3 illustrates a front view of an apparatus for workplace safety, according to one embodiment of the present teachings.

Referring now to FIG. 3, a subliminal security apparatus and method 300 comprises a wall 302 upon which a subliminal message 304 is disposed. As illustrated in FIG. 3, in one embodiment, teachings of the present disclosure may be adapted to support efficiency in a workplace environment, such as for example to encourage safety, thereby avoiding financial loses to a corporation such as loses due to medical issues or workforce downtime.

In this embodiment, the subliminal message 304, "SAFETY IN THE WORKPLACE" is designed to influence the subconscious mind of workers in a work environment, to encourage safe behavior to avoid physical injury. Although this embodiment utilizes techniques described above with respect to the previously disclosed embodiments, this embodiment target non-criminal behavior, such as for example behaving in a manner which may be dangerous to workers in their place of employment.

Figure 4:
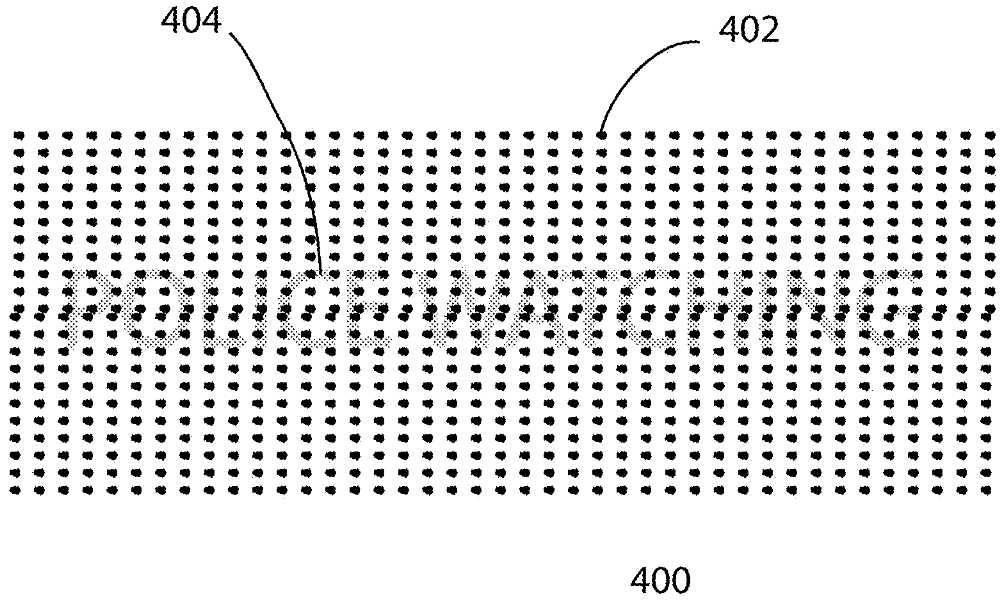
FIG. 4 illustrates a front plan view for an embedded subliminal security apparatus, according to one embodiment of the present teachings.

Referring now to FIG. 4, an embedded subliminal security apparatus 400 is illustrated. The embedded subliminal security apparatus 400 comprises a subliminal message 404, such as for example, "POLICE WATCHING" or other security message designed to negate the above-described mens rea and/or actus reus, wherein the subliminal message 404 is embedded within an enshrouding image 402. The enshrouding image 404 may be dots, arranged in a matrix, abstract design, picture, image, or literally any visual representation. The subliminal message 404 is nearly impossible to detect with the conscious mind through the enshrouding image 402, however the subconscious mind may detect the subliminal message 404. It will be appreciated that the enshrouding image 404 may be implemented upon a wall in an airport, such as a design or image, wherein the subliminal message 404 is targeted to negating the mens rea and/or actus reus or potential criminals. The enshrouding image 402 may also be adapted for use in a department retail store on a wall, having the subliminal message 404 adapted for deterring potential larceny.

It will be appreciated, that in addition to the above described embodiments, having visual subliminal messaging, it is also possible to employ audio subliminal messaging to either bolster the effectiveness of the visual subliminal messages, or in place of them. That is, the above described subliminal messaging may be adapted for audio applications, such as broadcasting sounds that appeal to the subconscious brain to influence deterrence of criminal activity and/or encourage workplace safety. For example, quiet audio messages, just below the audible range of human hearing may be employed to implement such audio subliminal messaging. In another embodiment, interspersing audio subliminal messages in music may also be employed to negate mens rea, actus reus, and/or influence workplace safety.

In one embodiment, within the scope and spirit of the present teachings, strobing lights may be used. For example, blue strobing lights with a reactive paint upon one or more walls may be used, wherein the light is a specific frequency designed to trigger the reactive elements with a paint upon a wall, such it is apparent to subliminal aspects of the human mind and eyes. In one example, the light and paint may be used to induce signs of nervousness in criminals. Also, embodiments of the present teachings may be used in police or other law enforcement interrogation rooms, and/or jails or prisons to induce desired confessions or behaviors.

Embodiments of the present teachings may be implemented using a video screen, such as for example using pixels on an LED or LCD screen. In one embodiment, the present teachings may be used at border crossings to induce criminals to express nervousness, which would then be obvious to guards The foregoing description illustrates exemplary implementations, and novel features, of aspects of a subliminal security apparatus and method. Alternative implementations are suggested, but it is impractical to list all alternative implementations of the present teachings. Therefore, the scope of the presented disclosure should be determined only by reference to the appended claims, and should not be limited by features illustrated in the foregoing description except insofar as such limitation is recited in an appended claim.

While the above description has pointed out novel features of the present disclosure as applied to various embodiments, the skilled person will understand that various omissions, substitutions, permutations, and changes in the form and details of the present teachings illustrated may be made without departing from the scope of the present teachings.

Each practical and novel combination of the elements and alternatives described hereinabove, and each practical combination of equivalents to such elements, is contemplated as an embodiment of the present teachings. Because many more element combinations are contemplated as embodiments of the present teachings than can reasonably be explicitly enumerated herein, the scope of the present teachings is properly defined by the appended claims rather than by the foregoing description. All variations coming within the meaning and range of equivalency of the various claim elements are embraced within the scope of the corresponding claim. Each claim set forth below is intended to encompass any apparatus or method that differs only insubstantially from the literal language of such claim, as long as such apparatus or method is not, in fact, an embodiment of the prior art. To this end, each described element in each claim should be construed as broadly as possible, and moreover should be understood to encompass any equivalent to such element insofar as possible without also encompassing the prior art. Furthermore, to the extent that the term "includes" is used in either the detailed description or the claims, such term is intended to be inclusive in a manner similar to the term "comprising".

What is claimed is:

1. A subliminal security apparatus, adapted for use upon a human eye, comprising:

a written subliminal message, comprising phosphorescent paint disposed upon a surface, adapted to be unperceivable to the human eye, and at least one optical element, adapted to convey a message to the human eye via the written subliminal message, wherein the at least one optical element is an enshrouding image consisting of dots within a matrix or an abstract design, picture or image, wherein the written subliminal message comprises phosphorescent paint.

2. The subliminal security apparatus of claim 1, further comprising wherein the at least one optical element is illuminated by a blue light or strobing light.

3. The subliminal security apparatus of claim 1, further comprising wherein the written subliminal message comprises a text color and a background color, wherein the text color is one or less different from the background color on a light reflection value scale.

* * * * *